United States Patent [19]

Nickles et al.

[11] 4,344,364

[45] Aug. 17, 1982

[54] APPARATUS AND METHOD FOR CONSERVING FUEL IN THE OPERATION OF A TRAIN CONSIST

[75] Inventors: Stephen K. Nickles; Suzanne M. T. Beaird, both of Duncan, Okla.

[73] Assignee: Halliburton Company, Duncan, Okla.

[21] Appl. No.: 148,523

[22] Filed: May 9, 1980

[51] Int. Cl.³ .................................................. B61C 5/00
[52] U.S. Cl. ................................. 105/62 R; 60/710; 60/711; 105/61; 246/167 R; 246/187 C; 364/442
[58] Field of Search .................... 105/61, 62 R; 246/5, 246/167 R, 187 C; 364/442; 60/710, 711

[56] References Cited

U.S. PATENT DOCUMENTS

| | | | |
|---|---|---|---|
| 3,380,399 | 4/1968 | Southard et al. | 105/61 |
| 3,384,032 | 5/1968 | Ruff | 105/61 |
| 3,384,033 | 5/1968 | Ruff | 105/61 |
| 3,482,089 | 12/1969 | Raffel et al. | 105/61 X |
| 3,696,758 | 10/1972 | Godinez, Jr. | 105/61 |
| 3,698,325 | 10/1972 | Grundy | 105/61 |
| 4,113,046 | 9/1978 | Arpino | 364/442 X |
| 4,159,088 | 6/1979 | Cosley | 364/442 X |
| 4,234,922 | 11/1980 | Wilde et al. | 105/61 |
| 4,253,399 | 3/1981 | Spigarelli | 105/61 |
| 4,266,485 | 5/1981 | Bruner et al. | 105/61 |

OTHER PUBLICATIONS

Vapor Corporation, "Power Setter" System.
Harmon Electronics, "Set-A-Speed", A Fuel-Saving Measure that Actually Improves Day-To-Day Operations.

Primary Examiner—Randolph A. Reese
Attorney, Agent, or Firm—John H. Tregoning; James R. Duzan; E. Harrison Gilbert, III

[57] ABSTRACT

The apparatus includes a master control unit associated with a first locomotive and a slave control unit associated with a second locomotive. Each of the control units is identically constructed to include an electronic processor and memory. The memory includes a program which is also identical for both units. Each of the units is connected to at least a portion of a train line extending between the locomotives, and inter-unit communications are accomplished over only a single spare line within the train line. Under control of the program the control units detect the setting of the throttle in the first locomotive, and in response thereto the control units operate the throttle of the second locomotive so that the combined operation of the first and second locomotives functions at an optimum power output-to-fuel consumption ratio within a predetermined range of power levels for each setting of the throttle in the first locomotive.

30 Claims, 10 Drawing Figures

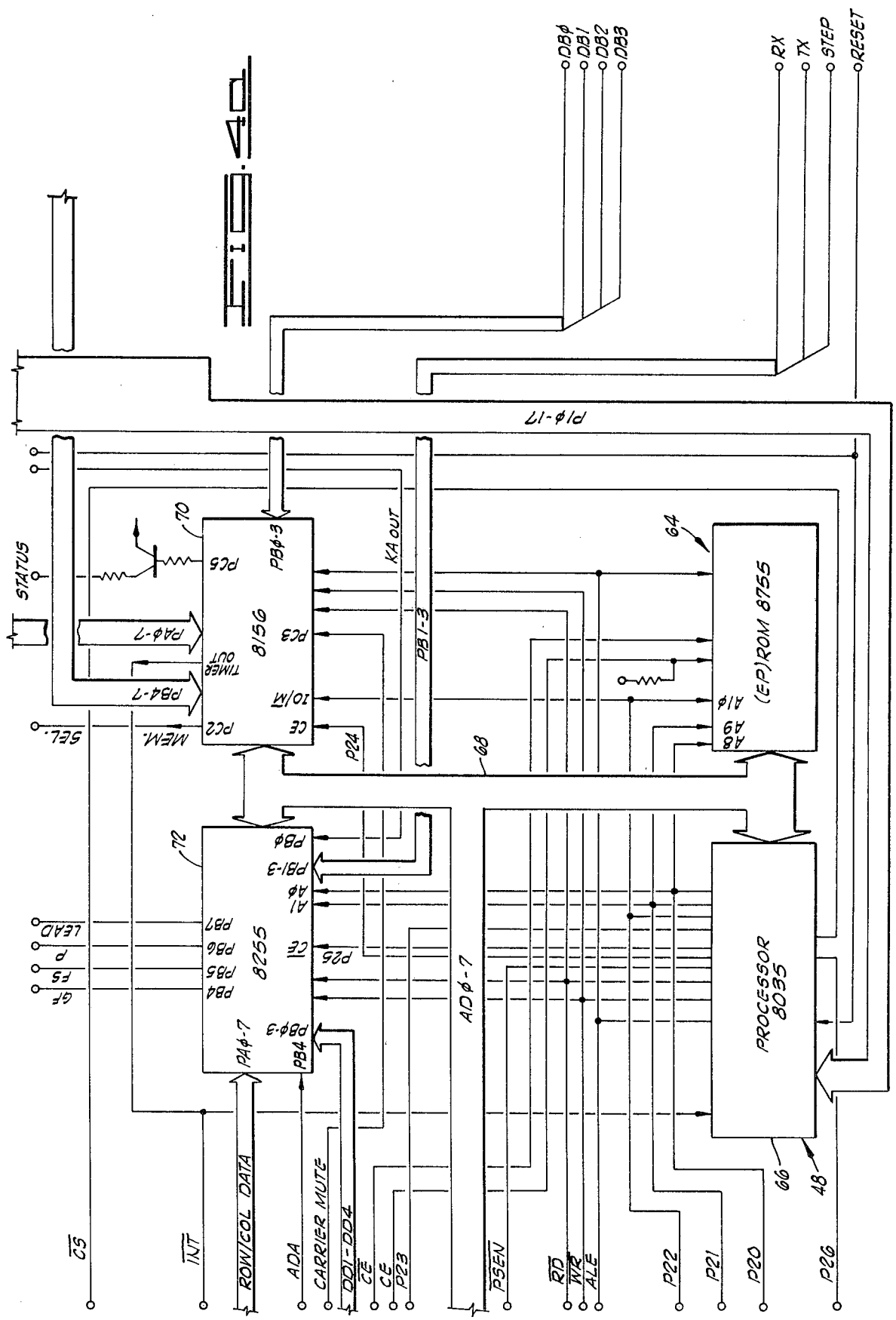

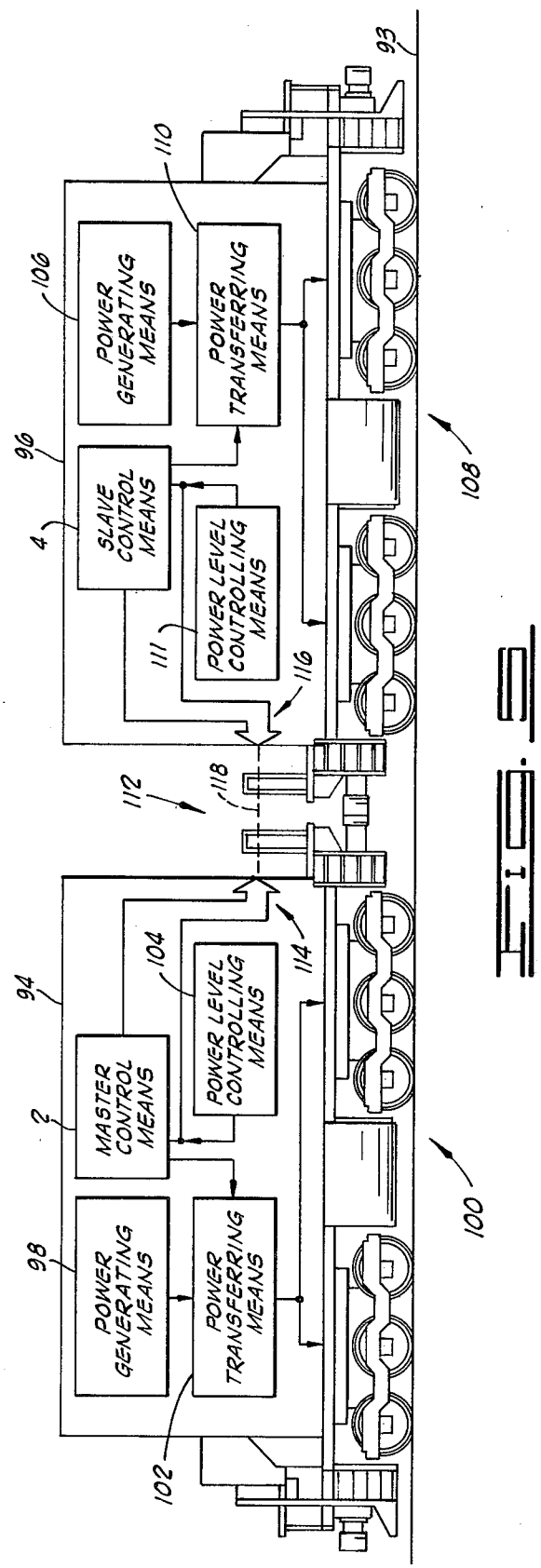

APPARATUS AND METHOD FOR CONSERVING FUEL IN THE OPERATION OF A TRAIN CONSIST

This invention relates generally to apparatus and methods for operating a train consist having a master locomotive and at least one slave locomotive so that fuel is more efficiently used. This invention relates more particularly, but not by way of limitation, to apparatus and methods for controlling the setting of the throttles in the slave locomotives in the train consist so that the combination of the settings of the throttles of the slave locomotives with the setting of the throttle of the master locomotive achieves an optimum power output-to-fuel consumption ratio within a predetermined range of power levels for each setting of the throttle control of the master locomotive.

In normal train operations the locomotives which are included within the train consist communicate with one another through an electrical train line. When the locomotives are mechanically coupled together, the electrical train lines are also coupled. Each locomotive receives its control signals via this train line. One locomotive within the train consist is designated the lead or master unit by means of an on board control switch, and the remaining locomotives within the consist are designated as trailing or slave units. The master locomotive puts the control signals on the train line and the slave units respond identically to the control signals. This normal operation is referred to as multiple unit (MU) control. Thus, in normal operation when the person in control of the master locomotive changes that locomotive's controls, all slave locomotives respond in like manner. For example, if the control person moves the throttle handle which controls the setting of the throttle of the master locomotive to position "8", the throttle in each slave locomotive automatically moves to identical throttle position "8". Because such operation of the locomotives within the train consist whereby each locomotive is operated at the same throttle setting as every other locomotive does not necessarily run the train at the most fuel efficient levels, unnecessary fuel losses can arise.

Fuel can be conserved by first selecting a tolerance on each side of the nominal power output which would be achieved by placing all the throttles at the same setting and then finding that combination of master and slave locomotive throttle settings which will yield a power output within the range of tolerances and which will yield an optimum power output-to-fuel consumption ratio. Once this finding has been made, whenever the throttle control of the master locomotive is placed at a particular setting, the throttles of the locomotives can be placed in the appropriate settings to achieve the optimum combination.

In view of the necessity of conserving our energy resources, other apparatus for more efficiently operating trains have been proposed and/or developed. One such apparatus controls the operation of a train consist as a function of the speed thereof. Another type of apparatus controls the amount of power provided by a consist by deleting certain locomotives from the power supplying chain of locomotives. Other types of control apparatus known to us include ones directed to the types of communication means between the locomotives. These means include the use of radio frequency signals, frequency shift keyed signals, and time division multiplexed signals. Other proposals disclose the use of inductive transducers or means which permit independent manual operation of the slave locomotive throttle controls.

A shortcoming of these devices is that they do not control the train consist as a function of an optimum power output-to-fuel consumption ratio for each setting of the master locomotive throttle. Furthermore, they fail to propose means for determining these various optimum ratios for the different types of locomotives which may form the consist. They also fail to disclose means for monitoring each slave locomotive to determine whether it is operating at the desired setting and for switching the slave locomotive throttle to the same setting as the master locomotive throttle control if indeed the slave locomotive is not operating at the desired setting.

The present invention overcomes the above-noted and other shortcomings of the prior art by providing a novel and improved apparatus and method for conserving fuel in the operation of a train consist. The present invention conserves fuel by controlling the settings of the throttles in the locomotives in the train consist on the basis of calculated optimum power output-to-fuel consumption ratios for each selected setting of the throttle control in the master locomotive. The present invention is capable of determining these optimum ratios for different types of locomotives which may be included within the consist. The present invention also monitors each locomotive to determine if it is operating at the desired throttle setting and switches any locomotive throttle to the selected setting of the master locomotive throttle control if the locomotive is not operating at the desired setting.

Broadly, the present invention provides an apparatus, responsive to the selected setting of the throttle means in a master locomotive, for controlling throttle means of locomotives in a train consist including the master locomotive and at least one slave locomotive. This apparatus comprises means for detecting the selected setting of the throttle means of the master locomotive and means, responsive to the detecting means, for operating the throttle means of the locomotives so that the train consist functions at an optimum power output-to-fuel consumption ratio within a predetermined range of power levels.

The operating means includes means for computing a desired setting of the throttle means of the slave locomotive yielding the optimum power output-to-fuel consumption ratio within the predetermined range of power levels for each respective selected setting of the throttle means of the master locomotive. The operating means further includes means, responsive to the computing means, for providing actuation signals to the throttle means of the slave locomotive to thereby actuate the throttle means to an actual setting. Further included within the operating means is comparing means for comparing the actual setting of the throttle means of the slave locomotive with the desired setting thereof for each respective selected setting of the throttle means of the master locomotive. To provide a fail safe means, the operating means further includes means for switching the throttle means of the slave locomotive to the selected setting of the throttle means of the master locomotive when the comparing means determines the actual setting of the throttle means of the slave locomotive is not the same as the desired setting thereof for the respective selected setting of the throttle means of the master locomotive.

The means for computing the desired setting of the throttle means includes means for storing a collection of locomotive performance data and means for utilizing at least a portion of the collection of locomotive performance data to compute the desired setting of the throttle means of the slave locomotive for each respective selected setting of the throttle means of the master locomotive.

Therefore, from the foregoing, it is a general object of the present invention to provide a novel and improved apparatus and method for conserving fuel in the operation of a train consist. Other and further objects, features and advantages of the present invention will be readily apparent to those skilled in the art when the following description of the preferred embodiments is read in conjunction with the accompanying drawings.

Figure 4B:
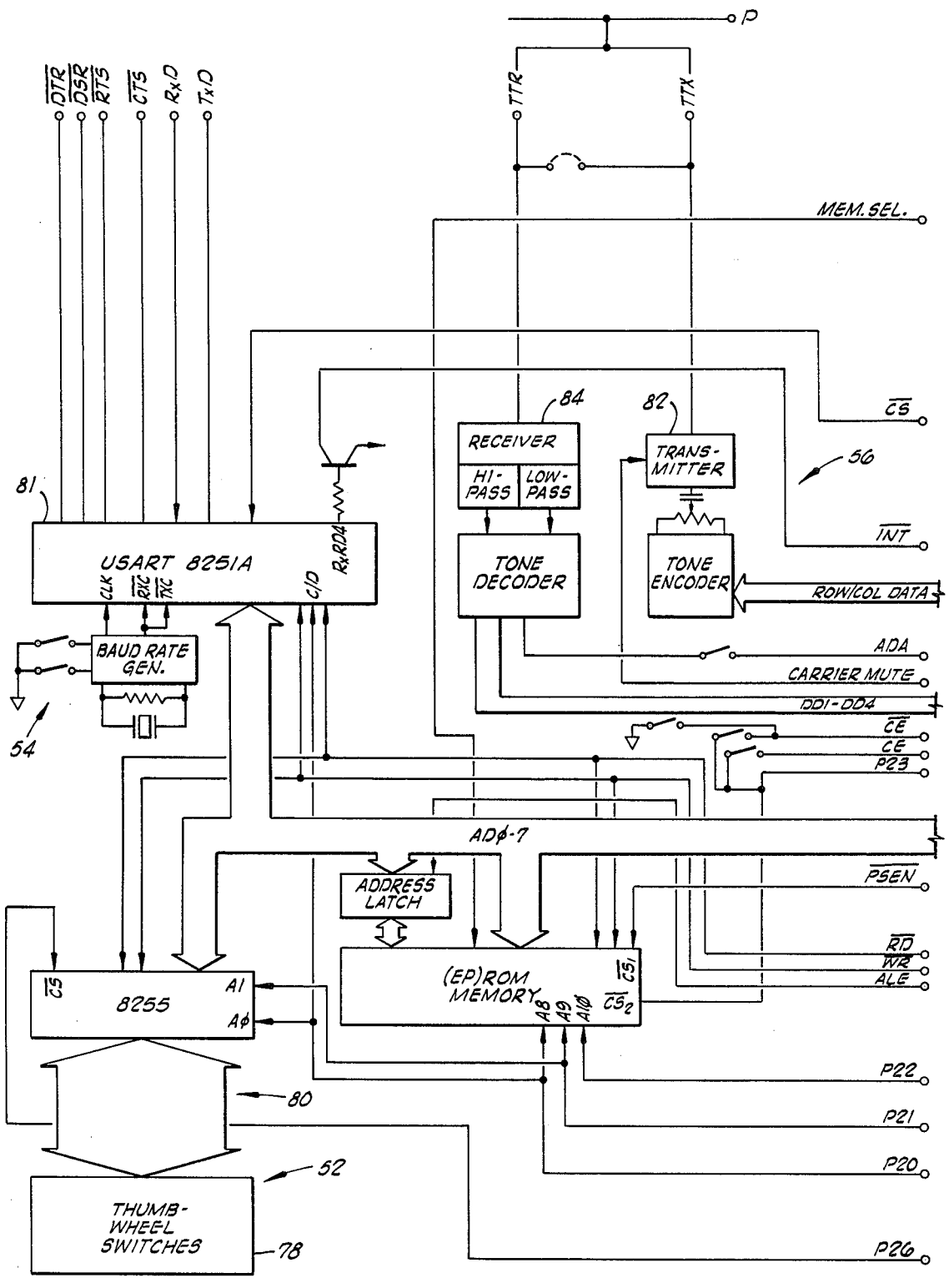
Figure 4C:
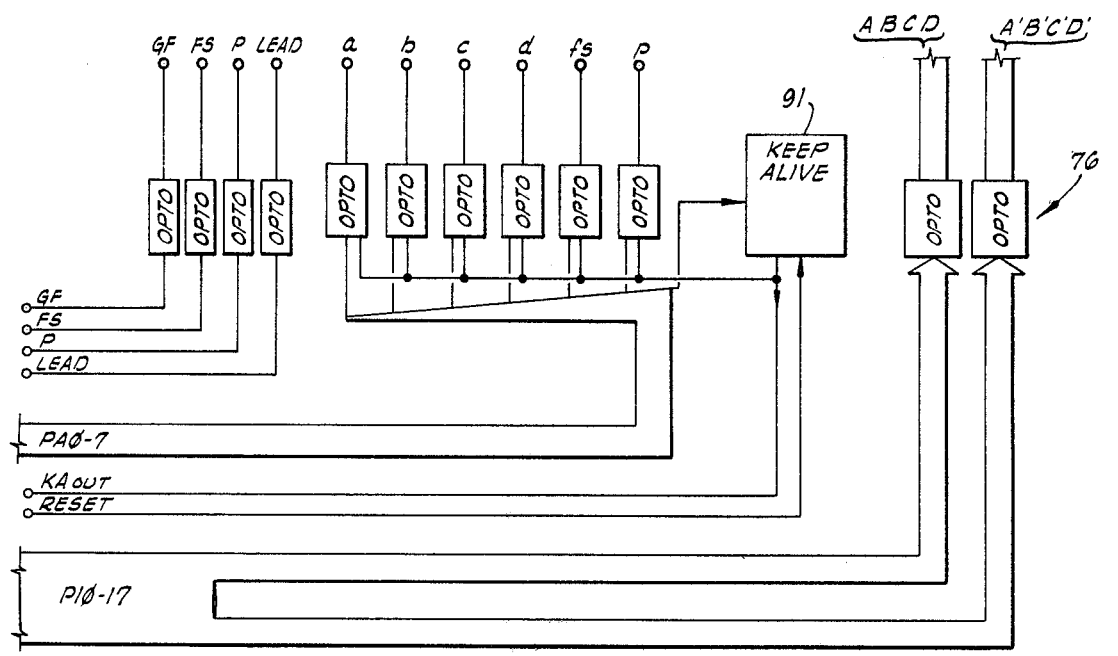
Figure 4C:
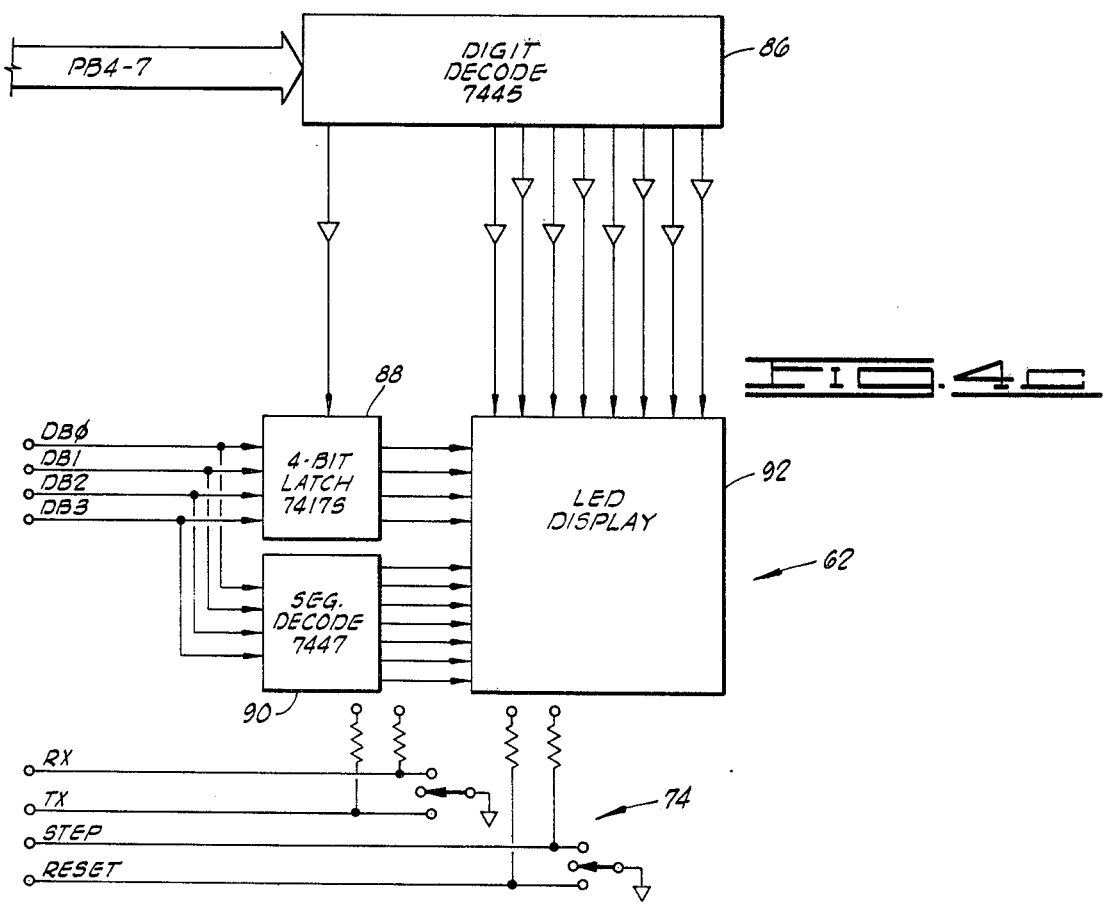

FIGS. 4a–4c comprise a schematic circuit diagram of a preferred embodiment of the controller unit of the present invention.

Figure 5C:
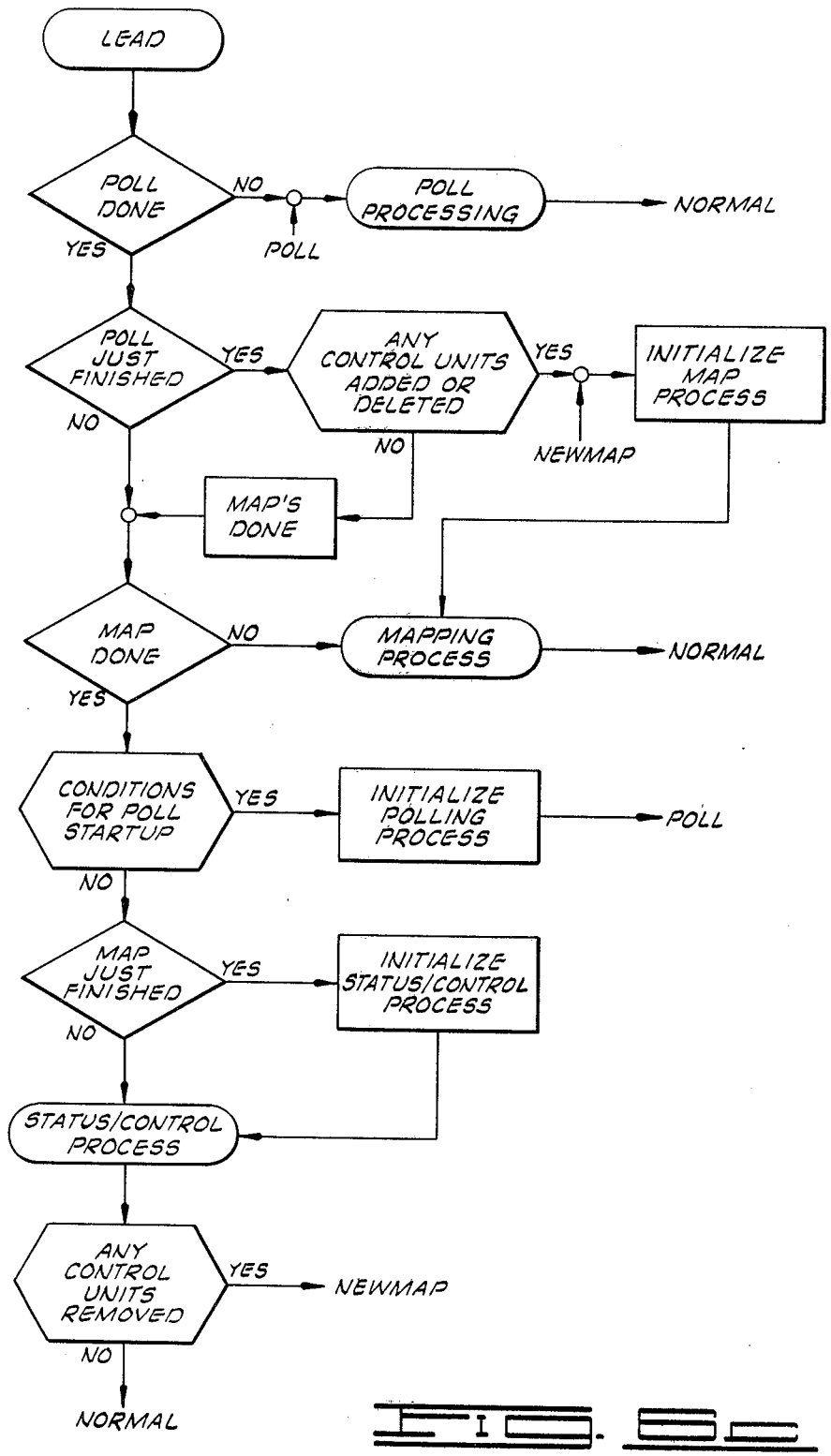

FIG. 5 is a schematic illustration of the present invention in association with elements of two locomotives.

Figure 6A:
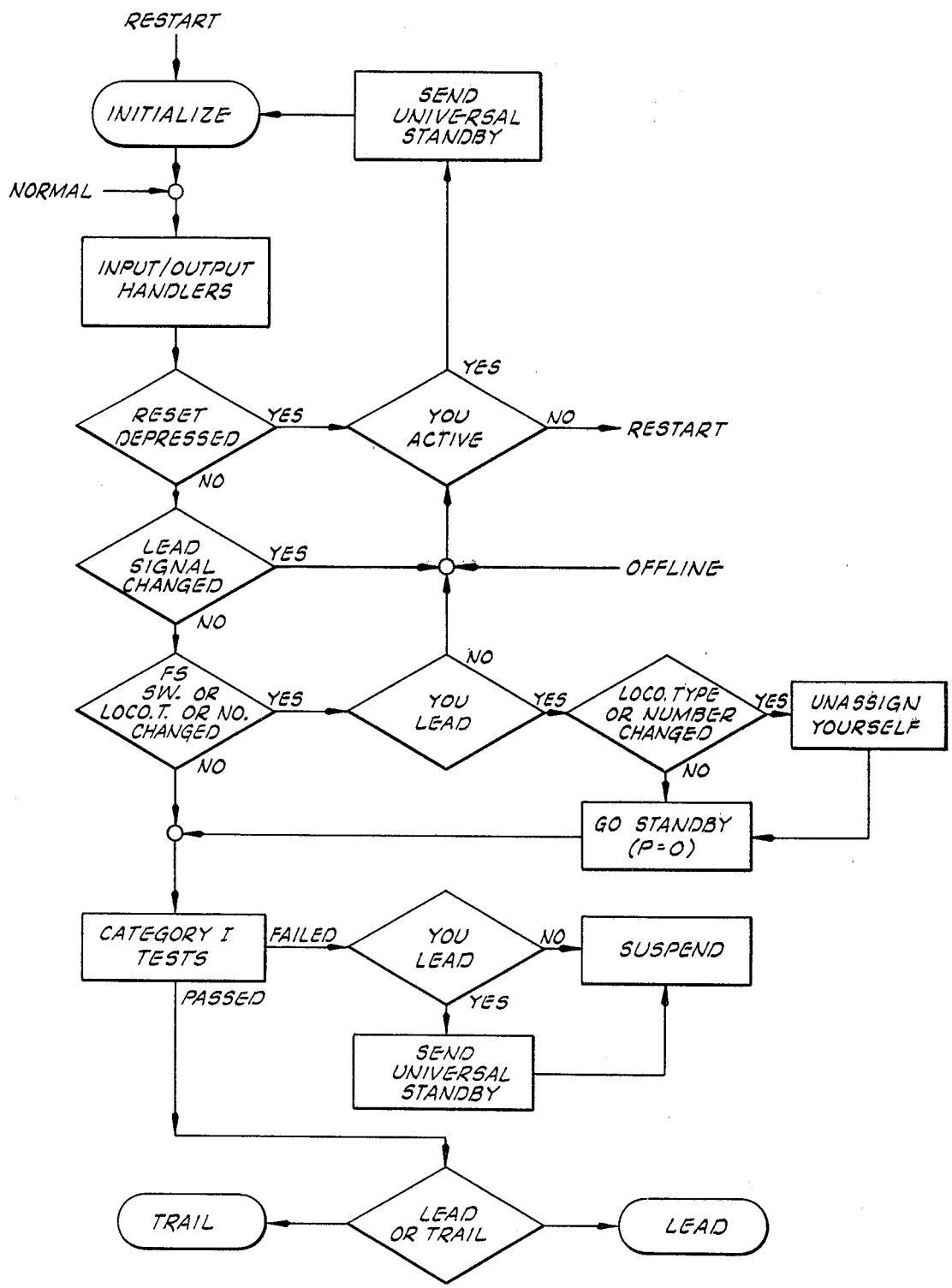
Figure 6B:
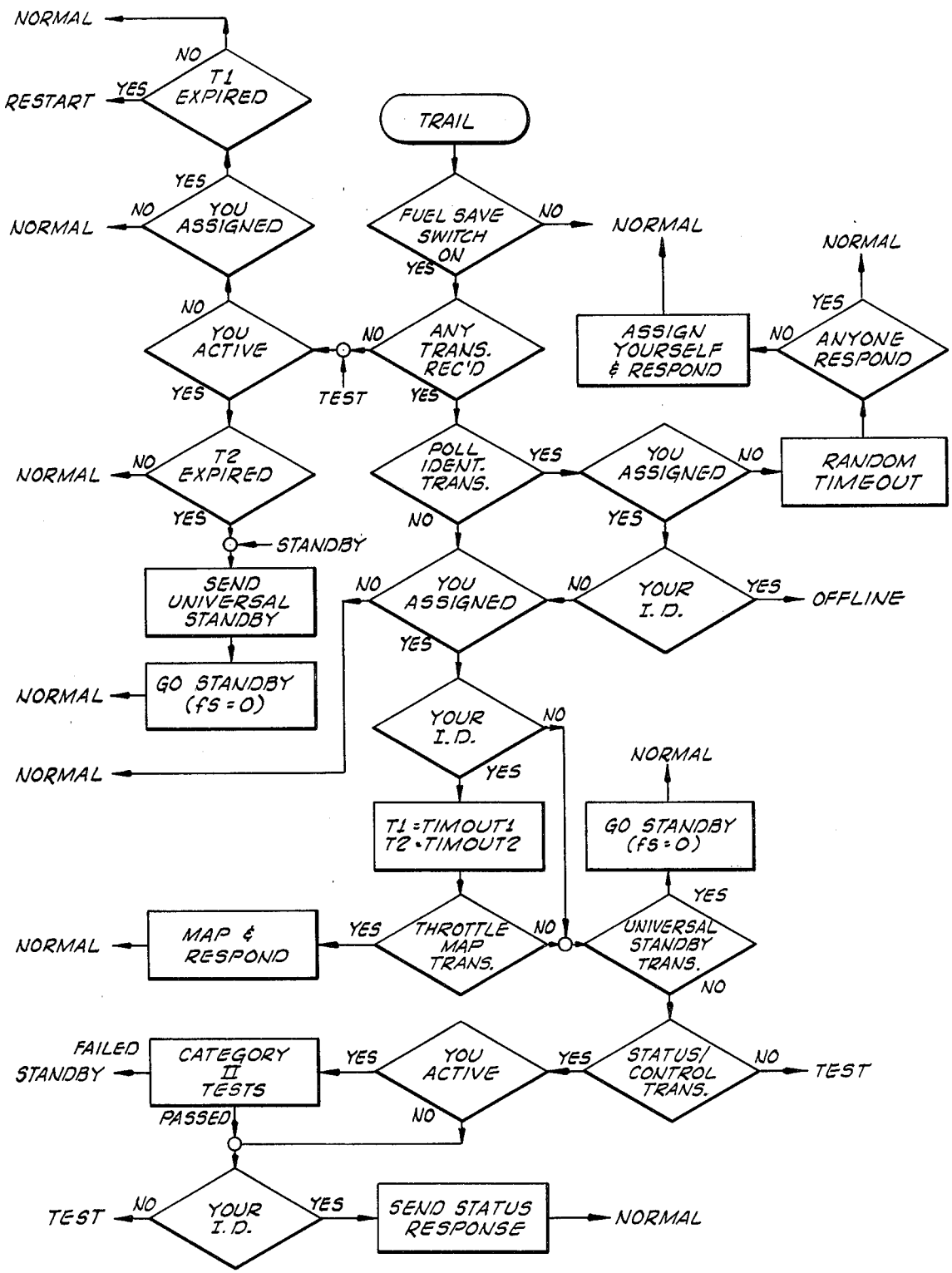

FIGS. 6a–6c comprise a flow chart of the program forming a part of the controller unit of the present invention.

A modern diesel-electric locomotive normally has eight discrete throttle settings (numbered "1" through "8") which are manually controlled by an engineer. Each throttle setting will command a specific horsepower level from the diesel engine and will require a specific fuel flow to maintain the prescribed horsepower level. Table I is a tabulation of these horsepower levels and fuel requirements for a typical SD-40 locomotive.

TABLE I

SD-40 Performance Data

| Throttle Position | HP | Gal/Hr | Efficiency HP-HR/Gal |
|---|---|---|---|
| 1 | 115 | 7.4 | 15.54 |
| 2 | 260 | 24.9 | 10.44 |
| 3 | 460 | 41.4 | 11.11 |
| 4 | 760 | 57.2 | 13.29 |
| 5 | 1115 | 79.0 | 14.11 |
| 6 | 1550 | 108.5 | 14.29 |
| 7 | 2045 | 145.8 | 14.03 |
| 8 | 2640 | 167.7 | 15.80 |

Also included in Table I is the direct ratio of the horsepower level (power output) to the fuel flow (fuel consumption) and is referred to as efficiency. The locomotive's fuel economy is directly proportional to the magnitude of the efficiency. It should be noted that the efficiency varies somewhat for each of the throttle positions with throttle position 8 being the most efficient.

In normal MU operation the overall efficiency values are fixed for each throttle setting because the locomotives in the consist have identical throttle settings. For example, if a train were powered by three SD-40 locomotives, this would result in a threefold increase in the horsepower output recorded in Table I and would require a threefold increase in fuel consumption. Therefore, the same overall efficiency would be achieved. If the throttles of each of the three locomotives were independently controlled, instead of being controlled in MU operation, efficiency could be improved. It is to the determination of the optimum combination of settings of the independently controlled throttles for each selected setting of the throttle in the master locomotive that the present invention is directed.

The technique of the present invention for determining the most efficient throttle setting includes setting allowable tolerances on the total of the normal horsepower output of all locomotives which would occur during MU operation at each particular selectable master locomotive throttle setting and then finding the combination of throttle positions which will produce a power output within the tolerance range and will yield the best total efficiency for each selected master locomotive throttle setting.

To perform this technique, an analysis based on the following parameters may be made:

TP = master locomotive throttle position selected $HP_n(TP)$ = Total normal horsepower output when all locomotives are under MU control for master throttle position TP.

$HP_{max}(TP)$ = Maximum allowable total horsepower output for master throttle position TP.

$HP_{min}(TP)$ = Minimum allowable total horsepower output for master throttle position TP.

HP = Horsepower output for any particular combination of throttle positions.

Based on the above definitions the total horsepower combinations are tested and the resulting combination which meets the above criteria is selected as the optimum throttle combination. By proceeding through each of the eight possible master locomotive throttle positions, a table can be constructed which gives the optimum combination of desired throttle settings for each master locomotive throttle setting. It is to be noted that the optimum combination is that one which yields the largest power output-to-fuel consumption ratio (i.e., the efficiency ratio) and which provides a power output within the predetermined range of power levels established by the selected tolerances. Such an optimum combination is computed for each selectable setting of the throttle of the master locomotive.

EXAMPLE

Create a table of optimum combinations of throttle settings for three SD-40 locomotives for master locomotive throttle positions 2 through 7.

Initially, assume that the predetermined tolerance is one-fourth the power difference between consecutive throttle settings. In other words let:

$HP_{max}(TP) = [3 \times HP_n(TP) + HP_n(TP+1)]/4$
$HP_{min}(TP) = [3 \times HP_n(TP) + HP_n(TP-1)]/4$ For instance, if TP=7, from Table I $HP_{max}(7) = (9 \times 2045 + 3 \times 2640)/4 = 6581$
$HP_{min}(7) = (9 \times 2045 + 3 \times 1550)/4 = 5763$
$HP_n(7) = 3 \times 2045 = 6135$ Table II is a table for $HP_{max}$, $HP_{min}$ and $HP_n$ for master throttle positions 2 through 7.

TABLE II

| TP | $HP_{max}$ | $HP_{min}$ | $HP_n$ |
|---|---|---|---|
| 2 | 930 | 671 | 780 |
| 3 | 1605 | 1230 | 1380 |
| 4 | 2546 | 2055 | 2280 |
| 5 | 3671 | 3079 | 3345 |
| 6 | 5021 | 4324 | 4650 |

TABLE II-continued

| TP | HP$_{max}$ | HP$_{min}$ | HP$_n$ |
|---|---|---|---|
| 7 | 6581 | 5763 | 6135 |

Table III is the resultant table of the optimum throttle combinations for each of the master locomotive throttle positions.

TABLE III

| Throttle | | HP OUTPUT | | GAL/HR | | HP-HR/GAL | | % MPH | % MPG |
|---|---|---|---|---|---|---|---|---|---|
| MU | OPTIMUM | MU | OPTIMUM | MU | OPTIMUM | MU | OPTIMUM | GAINED | GAINED |
| 2-2-2 | 1-1-3 | 780 | 690 | 74.7 | 56.2 | 10.44 | 12.28 | −11.5 | 17.6 |
| 3-3-3 | 1-1-5 | 1380 | 1345 | 124.2 | 93.8 | 11.11 | 14.34 | −2.5 | 29.1 |
| 4-4-4 | 1-5-5 | 2280 | 2345 | 171.6 | 165.4 | 13.29 | 14.18 | 2.9 | 6.7 |
| 5-5-5 | 1-4-8 | 3345 | 3515 | 237.0 | 232.3 | 14.11 | 15.13 | 5.1 | 7.2 |
| 6-6-6 | 7-8-1 | 4650 | 4800 | 325.5 | 320.9 | 14.29 | 14.96 | 3.2 | 4.7 |
| 7-7-7 | 5-8-8 | 6135 | 6395 | 437.4 | 414.4 | 14.03 | 15.43 | 4.2 | 10.0 |

This table also shows the resultant horsepower output, fuel flow and efficiency for normal MU control and for control in accordance with the present invention wherein the optimum throttle combinations are used. Two additional values are included in the table to illustrate the percent increase in train speed (mph) and fuel economy (mpg) when comparing MU control to the optimum throttle setting control. These percentages are based on both control techniques requiring identical pulling force output. It is to be noted that the present invention is not based on maintaining specified speeds as evidenced by the wide variance of speed change percentages shown in Table III.

Figure 1:
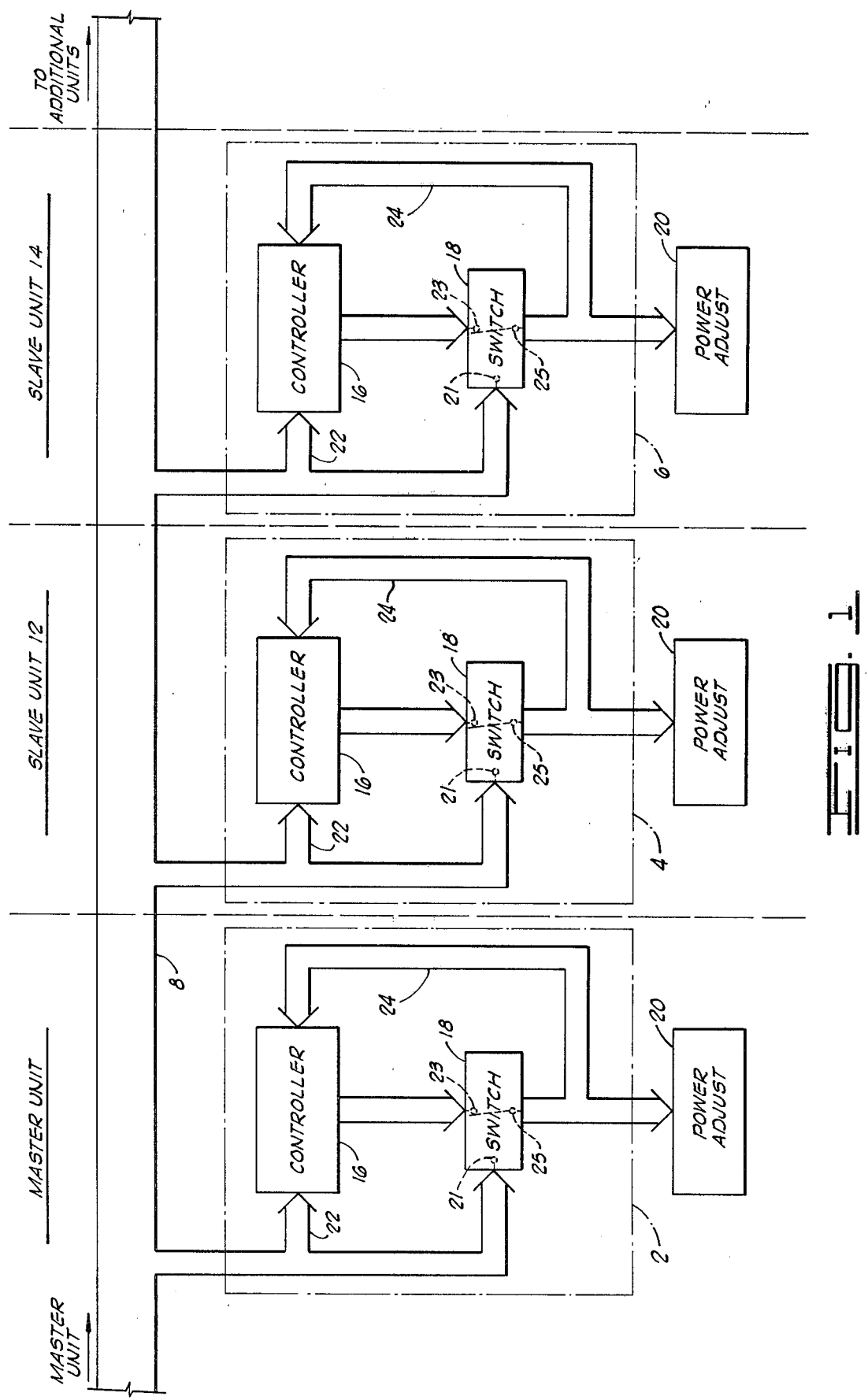
FIG. 1 is a schematic block diagram of the present invention as used with three locomotives.

With reference to the drawings and in particular to FIGS. 1-5, a preferred embodiment of an apparatus constructed in accordance with the present invention to implement the above-described theory of optimization will be described. Initially, FIG. 1 schematically shows a master control means 2, a first slave control means 4 and a second slave control means 6 which are structurally identical and which are constructed in accordance with the present invention. FIG. 1 further depicts that the master control means 2 is connected to a portion of a train line 8 having a plurality of conductors and extending within and from a master locomotive 10 to a first slave locomotive 12 and a second slave locomotive 14. The first and second slave control means 4 and 6 are connected to the same electrical conductors as is the master control means 2, but at respective portions of the train line within the respective locomotives with which the first and second slave control means 4 and 6 are associated. Although FIG. 1 discloses an embodiment wherein three control means are utilized, the present invention may be used with a master locomotive and any number of slave locomotives within the operating capability of the particular hardware and software components of the system.

As mentioned, each of the master and slave control means 2-6 is constructed identically, and FIG. 1 indicates that each includes a controller unit 16 and a switch unit 18 which are interconnected to provide an output to a respective power adjust unit 20. Each controller unit 16 receives signals from the train line 8, as indicated in FIG. 1 by reference numeral 22, and from the output of the switch unit 18, as indicated in FIG. 1 by reference numeral 24. By receiving the signals from the train line 8, the controller unit 16 can detect the setting of a throttle means in the master locomotive 10 because signals representing this throttle means setting are conveyed through the train line 8. By receiving the signals from the output of the switch unit 18, the controller unit 16 can monitor the actual setting of a throttle means contained within the power adjust unit 20.

The switch unit 18 includes a first input means, schematically depicted in FIG. 1 and identified by the reference numeral 21, for receiving the master locomotive throttle setting information signals from the train line 8. The switch unit 18 also includes second input means, schematically represented in FIG. 1 and marked with reference numeral 23, for receiving actuation signals which are generated by the controller unit 16. The switch unit 18 further includes switch means, schematically illustrated and labelled with reference numeral 25 in FIG. 1, for selectably connecting the first input means 21 or the second input means 23 to a throttle means included within the power adjust unit 20 in response to a command signal from the controller unit 16. The switch unit 18 forms a part of an output means associated with the controller unit 16 for providing the actuation signals to the throttle means. The controller unit 16 and the switch unit 18 will be more fully described with reference to FIGS. 2-5.

Figure 2:
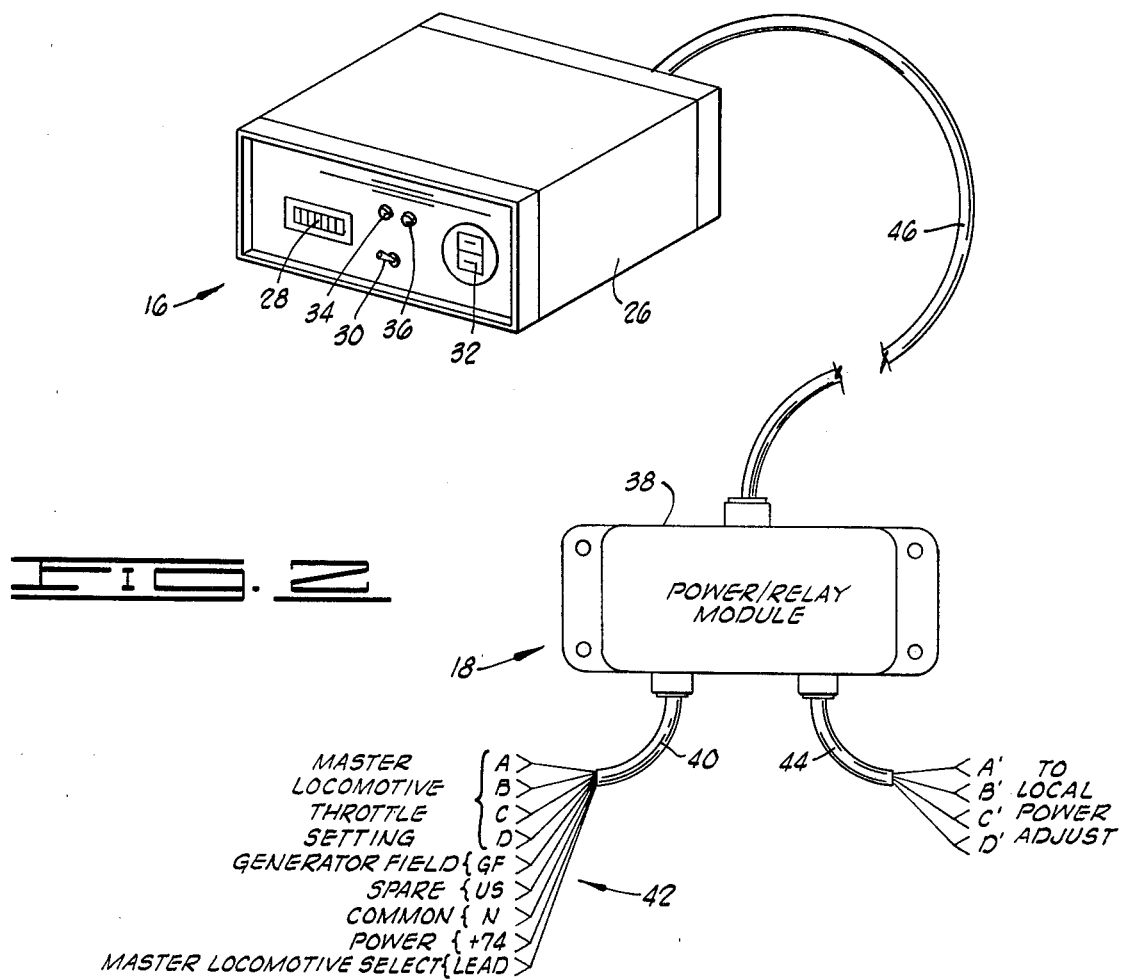
FIG. 2 is an illustration of a preferred embodiment of the exterior appearance of one control means of the present invention.

FIG. 2 discloses an illustration of a preferred embodiment of the external appearance of a control means suitable for use as either a master or slave unit. The controller unit 16 of the control means is shown disposed within a housing 26. Along the front of the housing 26 are a set of data entry switches 28, an on/off switch 30, a data read-out device 32, and indicator lamps 34 and 36. The data entry switches 28 are used to enter such information as the locomotive identification number and the locomotive model or type of the specific locomotive with which the particular controller unit 16 is used. The on/off switch 30 is also referred to as fuel saver (FS) switch so that when the switch 30 is in the "on" position, the controller unit 16 is operational and available for controlling its respective locomotive to conserve fuel. The display device 32 and the indicator lamps 34 and 36 are used to provide a person within the locomotive with information pertaining to the status of the operation of the particular unit and the overall system.

The preferred embodiment of the switch unit 18 shown in FIG. 2 is indicated to be a power/relay module 38 for providing an interface between the normal locomotive control lines (such as from the train line 8) and the controller unit 16 of the present invention. Associated with the module 38 is a first distribution cable 40 having a plurality of electrical conductors 42 which are connected to respective ones of the conductors within the train line 8. As shown in FIG. 2, four of the electrical conductors are connected to the four lines indicating the setting of the throttle in the master locomotive. Another conductor is connected to the line which indicates the status of the generator field of the master locomotive. A sixth conductor is connected to the spare line designated "US" in the train line. One of the final three conductors of the plurality of conductors 42 shown in FIG. 2 is connected to the power line, and a second one of the final three conductors is connected to the common line (also referred to as the negative or ground line) of the train line. The last of the conductors is connected to the lead, or master, locomotive select line. Also associated with the module 38 is a second distribution cable 44 having four electrical conductors for providing the throttle control signals to the throttle of the locomotive with which the particular controller unit 16 is associated. Each of the conductors within the first and second distribution cables 40 and 44 is connected to the controller unit 16 by means of a cable 46 shown interconnecting the switch means 18 and the controller unit 16.

Figure 3:
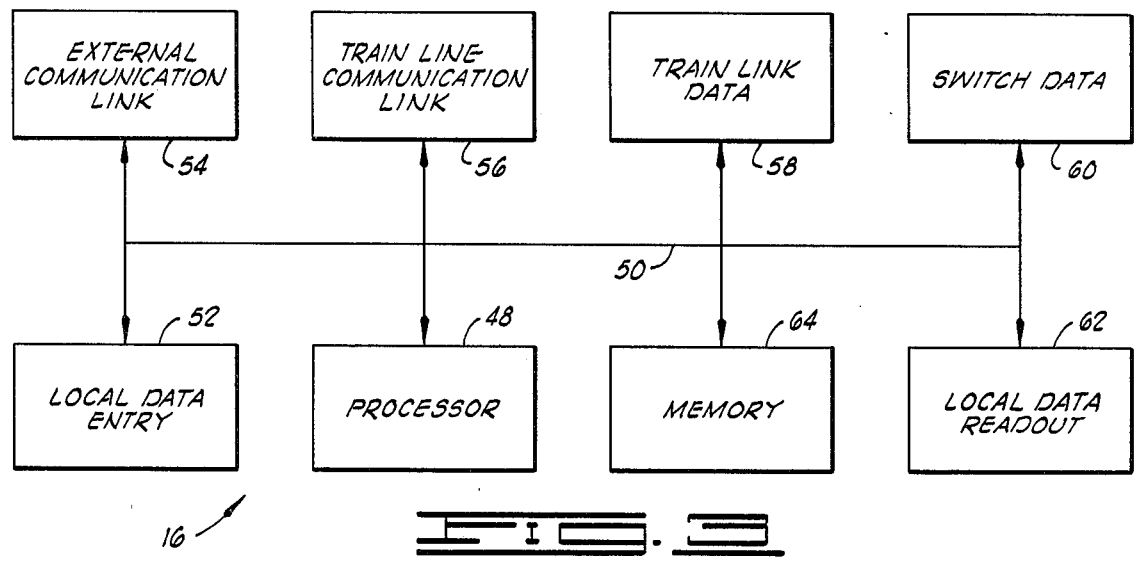
FIG. 3 is a block diagram of the preferred embodiment functional elements of the controller unit shown in FIG. 2.

The functional elements and the electronic circuit of a preferred embodiment of the controller unit 16 is disclosed in FIGS. 3 and 4a–4c. FIG. 3 indicates that the controller unit 16 includes processor means 48 which communicates along a bus system 50 with local data entry means 52, external communication link means 54, train line communication link means 56, train line data means 58, switch data means 60, local read-out means 62, and memory means 64.

Generally, the processor means 48 is operated under control of a program contained within the memory means 64 to effect the appropriate means whereby the master control means and the slave control means control their respective locomotives to conserve fuel. This combination of the processor means 48 and the program stored in the memory means 64 provides the basis of several functional elements within the apparatus of the present invention. For example, this combination of processor means and program, along with the train line data means 58, provides means for detecting the selected setting of the throttle means of the master locomotive because the train line data means 58 interfaces with the signals received over the electrical conductors within the first distribution cable 40. The processor and program combination further provides, as will become more apparent subsequently, the basis for means, responsive to the detecting means, for operating the throttle means of the slave locomotive so that the train consist functions at an optimum power output-to-fuel consumption ratio within a predetermined range of power levels.

With reference now to FIGS. 4a–4c, the functional elements disclosed in FIG. 3 will be more fully described. FIG. 4a shows that the processor means 48 includes, in the preferred embodiment, an electronic microprocessor 66 such as an Intel 8035 microprocessor. The microprocessor 66 communicates with the other elements of the controller unit 16 by means of an address/data bus 68.

One of the elements connected to the address/data bus 68 is the memory means 64. In the preferred embodiment shown in FIGS. 4a–4c the memory means includes a combination of read only memory (ROM) and random access memory (RAM). The memory means provides means for storing a collection of locomotive performance data in addition to the program which controls the operation of the processor means. The locomotive performance data to be stored in the preferred embodiment of the present invention is data for each type of locomotive which may be used in a train consist similar to the data listed in Table I. This collection of locomotive performance data is utilized during the running of the program which is more fully described below.

The processor means 48 and the program and other data stored in the memory means 64 function together so that the apparatus of the present invention includes means for computing a desired setting of the throttle means of each slave locomotive which yields the optimum power output-to-fuel consumption ratio within the predetermined range of powers for each respective selected setting of the throttle means of the master locomotive. Such a desired setting is exemplified by each of the optimum settings listed in Table III. In computing each desired setting the processor means utilizes at least a portion of the collection of locomotive performance data stored in the memory means.

FIG. 4a also shows that a first interface means 70 and a second interface means 72 are also connected to the address/data bus 68. The first interface means 70 provides an interface for the fuel save (fs) output from the controller unit 16 and for the "P" output therefrom. A status line is also interfaced by the first interface means 70. The first interface means 70 also provides an interface between the address/data bus 68 and the local data read-out means 62 shown in FIG. 4c. The first interface means 70 is also used to place the desired throttle setting signals, represented in FIG. 4c by the letters a, b, c, and d, on the respective lines for transmission to the switch unit 18 through the cable 46.

The signals a, b, c and d are actuation signals which are sent under control of the microprocessor 66 via an output means associated with the processor to the throttle means of the respective locomotive to thereby actuate the throttle means to an actual setting. The output means includes the first interface means 70 and the switch unit 18. The actual setting of the throttle means of the respective locomotive is indicated to the microprocessor 66 by means of the signals designated A', B', C' and D' in FIG. 4c. The signals a, b, c and d are provided to the second input means 23 of the switch unit 18 and the signals A', B', C' and D' are provided from the switch means 25 of the switch unit 18. By monitoring both of these sets of signals, the processor means 48 can compare the actual setting (A', B', C', D') of the throttle means with the desired setting (a, b, c and d). When this comparing means provided by the processor means 48 determines the actual setting of the throttle means is not the same as the desired setting thereof for the respective setting of the throttle means of the master locomotive, the processor means 48 instructs the switch means 25 to connect the switch means 25 output to the first input means 21 of the switch 18 to thereby switch the throttle means to the same setting as the selected setting of the throttle means of the master locomotive. Thus, the switch means 25 is responsive to the processor means 48.

The second interface means 72 receives and sends information from and to the train line communication link means 56. The second interface means 72 also receives the generator field (GF) signal, fuel save (FS) signal, "P" signal, and lead (master) locomotive select signal from the switch unit 18 shown in FIG. 2. The second interface means 72 also interfaces with the receive, transmit and step signals from a set of switches 74 shown in FIG. 4c.

FIG. 4a also shows that the microprocessor 66 is directly coupled to optical isolator means 76 which are shown in FIG. 4c interfacing with the master locomotive selected throttle setting information signals (A, B, C, D) and the actual slave locomotive throttle setting signals A', B', C', D') received through the switch unit 18 shown in FIG. 2. These elements provide receiver means which are connected to a predetermined number of the electrical conductors of the train line for receiving the master locomotive throttle setting information signals transmitted thereon.

For the preferred circuit embodiment shown in FIGS. 4a-4c, it will be understood that the first and second interface means 70 and 72 and the optical isolator means 76 and conductors through which the throttle setting signals are received constitute the elements of the train line data means 58 and switch data means 60 shown in FIG. 3.

FIG. 4b shows that the local data entry means 52 includes a set of thumbwheel switches 78 and an address/data bus interface means 80. The thumbwheel switches 78 are accessible through the front of the controller unit housing 26 as shown in FIG. 2. As previously mentioned, such data as the locomotive identification number and the locomotive type is to be entered through the thumbwheel switches 78. This information is accessed by the microprocessor 66 over the address/data bus 68. Because the number and tyep of locomotives forming a particular consist can vary, the processor means 48 uses the information entered through the thumbwheel switches 78 to determine the specific number and types of locomotives in the consist. The processor means 48 then utilizes this determination with the locomotive performance data to generate the desired setting signals for each throttle means of the locomotives in the consist.

FIG. 4b also shows that the external communication link means 54 includes a serial communication device such as a universal synchronous asynchronous receiver transmitter (USART) device 81. This external communication link may be used for such purposes as remotely controlling the controller unit 16 or monitoring the operation of the controller unit 16. The USART is connected to the address/data bus 68 for communicating with the microprocessor 66.

FIG. 4b also shows a preferred embodiment of the train line communication link means 56. This provides means for communicating each respective desired setting, calculated by the processor means in the master control means as subsequently described, to the slave control means associated with that respective one of the slave locomotives for which the respective desired setting was computed. In the preferred embodiment the train line communication link means 56 uses a single spare line of the train line to transmit and receive communications. The single spare line which is used in the preferred embodiment is the "US" line identified in FIG. 2. This communicating means includes a transmitter means 82 which generates, in the preferred embodiment configuration, dual-tone, multi-frequency signals which are coupled to a conventional voltage controlled oscillator circuit for frequency modulation, signal boost and transmission over the single spare train line. In the preferred embodiment the carrier frequency is between 100 kHz and 200 kHz. The communicating means 56 also includes a receiver means 84 for receiving and decoding the signal transmitted by another controller unit 16, such as the one in the master control means, within the fuel conserving system of the present invention. The receiver means 84 detects the generated transmitter signals and demodulates these signals utilizing a conventional phase-locked-loop circuit. Also included within the communicating means 56 is means for providing a carrier mute signal whenever transmissions are to be prevented.

FIG. 4c discloses the local data readout means 62 which includes digit decoder means 86, latch means 88, segment decoder means 90 and visual display means 92. The information to be displayed is transmitted over the address/data bus 68 to the first interface means 70 and then output thereby to respective ones of the decoder means 86, latch means 88 and decoder means 90 for energizing the visual display means 92. The visual display means may include light emitting diodes or other suitable illuminable elements.

FIG. 4c further shows the optical isolator means 76 used to isolate the circuit of the controller unit 16 from the electrical circuits of the switch unit 18 and train line 8.

FIG. 4c also discloses a "keep alive" device 91 which includes a timer means for disabling, or suspending, the respective controller unit if a program controlled signal is not provided to the device 91 within a predetermined period of time. In the preferred embodiment the "keep alive" device 91 disables the a, b, c, d, fs, and p outputs if the appropriate signal is not received within the time period. Once disablement occurs, the device 91 must be manually reset before the controller unit can again control its respective locomotive's throttle settings.

It is to be noted that each of the specific elements indicated in FIGS. 4a-4c are types which are known to those in the art; however, these specific elements are not to be taken as limiting the types of elements, or configurations thereof, which can be used within the scope of the present invention.

FIG. 5 illustrates a system for efficiently powering a train along a track 93. This system comprises a train consist including a first locomotive 94 having the master control means 2 inserted within the normal configuration of the operating elements of the locomotive and also including a second locomotive 96 having the slave control means 4 inserted within the normal configuration of the operating elements of the second locomotive. In particular, in the first, or master, locomotive 94 there is shown a first power generating means 98 which includes the diesel engine and the electrical generator driven thereby for generating electricity. The first locomotive 94 also includes first track engaging means 100 which includes the wheels for the embodiment shown in FIG. 5. So that the power may be transferred from the first power generating means 98 to the first track engaging means 100, the first locomotive 94 also includes first power transferring means 102 having a throttle and traction motors as is known in the art. The first locomotive 94 further includes a first power level controlling means 104 which includes a speed/power controller having eight discrete speed/power settings as is known in the art. The speed/power controller and the throttle are included in the throttle means referred to hereinabove.

The second, or slave, locomotive 96 of the train consist shown in FIG. 5 includes a second power generating means 106, a second track engaging means 108, and a second power transferring means 110 for transferring power in discrete quantities from the second power generating means 106 to the second track engaging means 108. A power level controlling means 111 is also included in the second locomotive 96. Each of these elements is identical to the corresponding elements in the first locomotive 94 if the two locomotives are the same type. If the locomotives are different types, then possibly structurally different, but functionally similar, components will be included within each of these elements.

So that the two locomotives 94 and 96 may communicate with each other, the system for efficiently powering the train further includes a train line 112 having a plurality of electrical conductors. The train line 112 includes a first segment 114 associated with the first locomotive 94, a second segment 116 associated with the second locomotive 96 and coupling means 118 for coupling the first segment 114 to the second segment 116 when the two locomotives are mechanically coupled. The coupling means 118 is any suitable type as is known in the art.

The system further includes the slave control means 4, connected to a predetermined number of the electrical conductors in the second segment 116 of the train line 112, for actuating the second power transferring means 110. The slave control means 4 is constructed in accordance with the present invention as previously discussed and disclosed in FIGS. 1-4c.

The system further includes the master control means 2 which is connected to a predetermined number of the electrical conductors in the first segment 114 of the train line 112. These electrical conductors are the same ones to which the slave control means 6 is connected. The master control means 2 includes means for determining the desired discrete quantity of power to be transferred from the second power generating means 106 to the second track engaging means 108 by the second power transferring means 110 for each discrete selected setting of the power level controlling means 104 in the first locomotive 94. This means also determines the quantity of power to be transferred from the first power generating means 98 to the first track engaging means 100 by the first power transferring means 102 for each discrete selected setting of the power level controlling means 104. The desired discrete quantity of power to be transferred is determined so that the sum of the quantities of the power supplied to the first and second track engaging means 100 and 108 is within a predetermined range of power levels for each discrete setting of the power level controlling means 104 in the first locomotive 94 and further so that the ratio of the sum of the quantities of the power supplied to the amount of fuel consumed by the first and second power generating means 98 and 106 for that sum of power quantities is not less than any of the other power output-to-fuel consumption ratios which would exist for different ones of the discrete quantities of power which could be supplied from the second power generating means 106 to the second track engaging means 108 for each discrete setting of the power level controlling means 104. The master control means 2 further includes means for communicating to the slave control means 4 what discrete quantity of power is desired to be transferred by the second power transferring means 110 for each discrete setting of the power level controlling means 104.

FIGS. 6a-6c disclose a flow chart depicting a preferred embodiment of the program which is to be used to control the operation of the previously described apparatus. This program implements several diagnostics which should be performed by the system of the present invention to insure that it is operating properly. One type of diagnostic is the self diagnostic which each control means, both master and slave, performs. This type of diagnostic is identified as a category I type and operates so that the various inputs available to each control means is analyzed to determine if an internal failure has occurred. For example, an internal failure will be diagnosed if the program determines either that there is an inactive P signal or that the fs line is not currently activated, and the throttle setting output signals to the respective locomotive's throttle are not the same as the signals indicating the throttle setting of the master locomotive. Each unit will also know there is a failure if the P signal is active and the fs line is also active but the output to the respective locomotive's throttle is not the same as the desired throttle setting of that respective locomotive for the actual selected setting of the master locomotive throttle.

Another type of diagnostic is the mutual diagnostic which is identified as a category II test. This diagnostic studies the various inputs available to each individual control means to detect a possible system, as opposed to an internal, defect. Any control means detects a system problem possibly exists if, for example, it determines that its own train line reading (A, B, C, D, P, GF signals shown in FIGS. 2 and 4c) is not in agreement with the status/control communication sequences originating from the master control means. Each control means also determines a system problem possibly exists if a valid communication sequence is not received for a specified number of message time periods.

A third type of diagnostic implemented in the program of the present invention is the supervisory diagnostic which studies the various inputs available only to the master control means for the purpose of permitting it to uncover a system defect. This is a category III type of diagnostic and includes the detection of such a problem as the failure of any slave control means to properly respond to an inquiry from the master control means.

A fourth type of diagnostic which is not implemented in the software but which is desireable for the complete monitoring of the system is the engineer diagnostic which includes a study by the person in control of the locomotive of the various faults which might not be detectable by the hardware or software of the system. Examples of these types of problems would include those which can be diagnosed only by sight, sound or feel.

Besides containing provisions for diagnosing internal and system failures, the preferred embodiment of the program includes routines for responding to malfunctions which are detected. For the program diagnosable failures (i.e., those detectable through the self, mutual or supervisory diagnostics), the present invention includes hardware which responds to an appropriate software command to place the respective control means in a suspended mode which requires a manual reset to place the respective control means in operation again. This suspended state causes the respective locomotive to operate in the normal MU manner whereby the throttle setting of the particular MU slave locomotive throttle is the same as the selected setting of the master locomotive throttle.

Another malfunction response feature is that the software of any control means which detects a potential system malfunction is able to transmit a universally understood standby or abort transmission which will cause all of the control means, both master and slave, in the system to revert to normal MU operation. This transmission is identified as the universal standby transmission.

A further provision is that the software of each unit includes a routine which detects when it is functioning to control the master control means so that the P signal can be dropped at the detection of one or more predetermined failures. This provides a fail-safe control in the present invention.

Still another provision of the present invention is that when the fuel save (FS) switch 30 is turned off, the source of the P line signal is removed from the system. This permits the person in control of the locomotive to override the operation of the present invention. When this override occurs, the ability of the control means to control the throttle setting of its respective locomotive is disabled. However, the master control means is still able to transmit and receive messages along the spare train line.

As a result of the above provisions of the program, each control means can reside in any one of four different states. One state is the "unassigned" state. A control means which resides in this state has not been assigned an address by the master control means, and is essentially waiting for such an assignment. The unassigned control means has no control over the throttle settings of its respective locomotive during this mode.

A second mode is the "assigned/standby" mode wherein a control means has been assigned a communication address by the master control means, but is not controlling its locomotive's throttle because it is awaiting further instructions from the master control means.

The third mode is the "assigned/active" mode wherein a control means has been assigned a communication address and is actively controlling its locomotive's throttle. A control means enters this state only upon command by the master control means.

The final mode is the "suspended" mode. A control means which has entered this state has been completely incapacitated as far as controlling its respective locomotive's throttle or using its communication facilities. This state is reversible only upon manual reset and is entered upon the detection of an appropriate type of failure. This mode can be entered either by commands from the master control means or at its own command as arising, for example, from the operation of the category I diagnostic.

Another important aspect of the system's diagnostic operation is in the area of human trouble-shooting. A control means which has a definite problem and "suspends" itself may have detected the malfunction under one of two possible situations. First, the control means may be directly communicating with the master control means. Second, it may be operating in isolation from any of the other control means. In the first situation the train may typically be moving when the suspension occurs. The suspension of the control means can be indicated to the person in control in the master locomotive by causing the status lamp on the front panel of the controller unit housing 26 to flash. The person in control can then report the malfunction when the train arrives at its destination. In addition to causing the status lamp of the master control means to flash, the suspended control means can also turn its own status lamp off. Thus, when the locomotive consist is walked at the next destination, the faulty unit can be spotted at a glance. In the second situation, there is no master control means to announce the fault, so the suspended control means merely turns off its own status lamp.

With more particular reference now to the particular flow chart disclosed in FIGS. 6a-6c, the general operation will be described. Although the program within each individual control unit is identical, different portions of the program are utilized depending upon whether a particular control means is acting as a master or slave control means. The particular operation of the program as it functions in a control means designated as the master will first be described, and then the operation of the program in a control means designated as a slave will be described. The designation of either master or slave is effected by appropriately setting the master locomotive select switch in each locomotive in the train consist.

The master control means initially goes through the basic system initialization process to clear the memory and the output ports and to perform general housekeeping functions. This process occurs when the unit is initially powered up or when the reset switch is depressed or when the master locomotive select switch goes from off to on designating that unit as the master control means.

Next, a poll process is semi-continuously performed. That is, the polling sequence is not performed only one time after the initialization process. The semi-continuous polling sequence occurs when no slave control means has been assigned an address or when the fuel save (FS) switch is off or when the GF line of the train line has been out for a specified period of time. The polling sequence occurs by having the master control means transmit instructions to each of the individual slave control means within the system and then having the respective slave control means properly respond.

At the completion of a polling sequence, the optimized throttle settings of all the throttles of the locomotives which are to be in the system are computed. This throttle mapping is performed during the initial operation of the system and any time thereafter when one of the semi-continuous polling cycles reveals either units have been added or units have been deleted from the system defined by a prior polling cycle. This programming sequence whereby all the optimized throttle settings are computed and then sent to the respective slave control means permits each slave control means to immediately output an optimum throttle setting to its respective throttle without awaiting a command from the master control means. This immediate output of the optimum throttle setting occurs in response to the selected throttle setting of the master locomotive throttle controller mechanism of the throttle means.

After all the control means, both master and slave, have been optimized and programmed and the fuel save (FS) switch has been turned on at the master control means, the active control sequence occurs. Initially, the master control means sends a status/control sequence to each assigned slave control means to tell the slave control means to go active. If all slave units reply and pass the category III diagnostic check by the master control means, the master unit activates its P signal which puts the P signal on the spare train line (designated US in FIG. 2 and P in FIG. 4b) along with the transmit and receive signals. The master control means continues this sequence to verify each unit's integrity while simultaneously outputting its own optimum throttle settings.

If during this active control sequence, the master control means determines that a category III fault has occurred or it receives a universal standby transmission from a slave control means, it immediately drops the P signal output and thereby disables the system. Thus, the P signal is used as a fail safe control signal. The master control means then attempts to resolve the fault. Resolvable faults include such an occurrence as a slave control means disagreeing with the common train line readings (A, B, C, D, GF, P). Another resolvable fault is the control means' feedback throttle signals (A', B', C', D') being different from the desired throttle setting signals (a, b, c, d). However, this type of fault should typically be detected by the faulted control means as a category I error whereby the faulted unit automatically suspends itself without having to be suspended by the master control means. Another resolvable fault is one wherein a unit fails to respond properly to the status/control sequence from the master control means. For example, if all of the control means respond to the queries from the master control means except one, then this one has possibly lost the function of its transmitter or receiver or has previously suspended itself. These resolvable faults are diagnosed by the master control means and the offending control means is commanded via the status/control sequence to suspend itself.

Certain category III faults cannot be resolved. One such fault arises from unreliable communication errors caused by a faulty transmitter in the master or slave control means or by a faulty receiver in the master control means. Another unresolvable fault occurs when a clear majority of all the control means disagrees with the common train line readings. For example, if there is only one slave control means and one master control means and they do not agree with the A signal from the master locomotive throttle then this fault cannot be resolved. When such unresolvable problems are encountered, the master control means does not activate the system.

In a slave control means the program stored therein goes through essentially the same initialization process as the program in the master control means. However, one difference is that the slave control means also performs the initialization process whenever the locomotive type or locomotive number is changed.

After initialization, any slave control means which is in the unassigned state will typically be waiting to receive a poll identification sequence from the master control means. The reply to the reception of such a sequence is handled by utilizing the random time response feature implemented in the present invention. As soon as a slave control means responds, it considers itself assigned.

Once a control means has been assigned an address, there are only three ways by which a unit can become unassigned. First, if the slave control means is in the assigned mode and it receives a poll identification sequence for its currently assigned address, it immediately unassigns itself. Also, if a control means does not have a valid communication addressed to it for a fixed period of time, it unassigns itself. Third, if the fuel save switch is turned off, the master locomotive select signal changes, the locomotive type changes or the locomotive number changes, then the control means also unassigns itself.

After the program in the slave control means handles the poll identification sequence and response thereto, the program awaits the next two communication sequences addressed to the particular control means. These sequences are the lower and upper throttle programming sequences. These sequences program the slave control means with its various optimum throttle settings for each master locomotive throttle setting so that when the slave control means is placed in the assigned/active mode it will then monitor the train line for the actual setting of the master locomotive throttle controller mechanism, find the corresponding desired throttle setting for its respective slave locomotive, and then output the setting to the throttle.

During the operation of the slave control means, it receives status/control sequences from the master control means. These sequences indicate such things as whether the slave control means should be in the assigned/standby mode, assigned/active mode or suspended mode. Other data is also provided during these sequences to permit the slave control means to make rational diagnostic decisions of the category II type.

When a unit is fault-free (i.e., passes the category I and II tests) and is commanded to go active by the master control means, it outputs the optimum throttle settings (the a, b, c and d signals shown in FIG. 4c) in accordance to its reading of the train line signals (the A, B, C and D signals shown in FIG. 4c) indicating the actual setting of the master locomotive throttle and turns on its fs line. In other words the electronic processor means of each control means which has been preset to include the desired throttle settings for the throttle means of its respective locomotive responds to the transmissions received thereby, including the signals A, B, C and D, by outputting the appropriate a, b, c and d signals to control the operation of the respective locomotive. Once the slave control means has gone active, it maintains the fs line on until a fault is detected, or it is instructed to enter the assigned/standby mode by the master control means, or it detects a universal standby transmission.

As each control means performs its task of controlling the setting of the throttle means of its respective locomotive, it also performs category I tests. Any control means that detects a category I fault responds by broadcasting a universal standby transmission and by entering the suspended mode if the control means was in the assigned/active mode. If the control means was not in the assigned/active mode, it simply enters the suspended mode.

Each control means also conducts category II tests, and any control means which experiences a category II fault responds in one of the following manners. Any control means in the assigned/active mode broadcasts a universal standby transmission and then goes to the assigned/standby mode. Assigned/active mode units which do not receive a status/control sequence from the master control means directed to them within a predetermined number of message times broadcast a universal standby transmission and go into the assigned/standby mode. Any assigned unit which is in the standby mode for a fixed length of time without receiving a transmission directed to it unassigns itself.

Thus, the present invention for an apparatus and method of conserving fuel in the operation of a train consist is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus, responsive to the setting of a throttle means in a master locomotive, for controlling a throttle means of a slave locomotive in a train consist including the master locomotive and the slave locomotive, said apparatus comprising:

means for detecting the setting of the throttle means of the master locomotive; and means, responsive to said detecting means, for operating the throttle means of the slave locomotive at an optimum power output-to-fuel consumption ratio within a predetermined range of power levels.

2. An apparatus as recited in claim 1, wherein said operating means includes means for computing a desired setting of the throttle means of the slave locomotive yielding the optimum power output-to-fuel consumption ratio within the predetermined range of power levels for each respective setting of the throttle means of the master locomotive.

3. An apparatus as recited in claim 2, wherein said computing means includes:

means for storing a collection of locomotive performance data; and means for utilizing at least a portion of the collection of locomotive performance data to compute the desired setting of the throttle means of the slave locomotive for each respective setting of the throttle means of the master locomotive.

4. An apparatus as recited in claim 2, wherein said operating means further includes means, responsive to said computing means, for providing actuation signals to the throttle means of the slave locomotive to thereby actuate the thottle means to an actual setting.

5. An apparatus as recited in claim 4, wherein said operating means further includes means for comparing the actual setting of the throttle means of the slave locomotive with the desired setting thereof for each respective setting of the throttle means of the master locomotive.

6. An apparatus as recited in claim 5, wherein said operating means further includes fail safe means for protecting said operating means and the locomotives by switching the throttle means of the slave locomotive to the same setting as the setting of the throttle means of the master locomotive when said comparing means determines the actual setting of the throttle means of the slave locomotive is not the same as the desired setting thereof for the respective setting of the throttle means of the master locomotive.

7. An apparatus as recited in claim 6, wherein said computing means includes:

means for storing a collection of locomotive performance data; and means for utilizing at least a portion of the collection of locomotive performance data to compute the desired setting of the throttle means of the slave locomotive for each respective setting of the throttle means of the master locomotive.

8. An apparatus for controlling the settings of respective throttle means of a plurality of locomotives forming a train consist, comprising:

master control means, associated with a first one of the plurality of locomotives and responsive to a respective selected setting of the throttle means of the first one of the plurality of locomotives, for placing the throttle means of the first one of the plurality of locomotives in an actual setting; and slave control means, associated with each of the others of the plurality of locomotives and responsive to said master control means, for placing the throttle means for each of the others of the plurality of locomotives in a respective setting for each respective selected setting of the throttle means of the first one of the plurality of locomotives, the respective actual setting of the throttle means of the first one of the plurality of locomotives and the respective settings of the others of the plurality of locomotives forming a combination of throttle means settings which operates the plurality of locomotives at the largest power output-to-fuel consumption ratio within a respective predetermined range of power levels for the respective selected setting of the throttle means of the first one of the plurality of locomotives.

9. An apparatus as recited in claim 8, wherein said master control means includes:

means for storing a collection of locomotive performance data;

means for determining the number of locomotives forming the train consist and the type of each locomotive therein;

means, utilizing said storing means and said determining means, for generating a respective desired setting for each of the throttle means of the others of the plurality of locomotives at each respective selected setting of the throttle means of the first one of the plurality of locomotives, the desired settings for a respective selected setting of the throttle means of the first one of the plurality of locomotives forming a combination of throttle means desired settings which yields the largest power output-to-fuel consumption ratio within the predetermined range of power levels; and means for communicating each respective desired setting to said slave control means associated with that respective one of the others of the plurality of locomotives for which the respective desired setting is generated.

10. An apparatus as recited in claim 9, wherein said communicating means includes a single line in a train line having a plurality of lines therein and extending between adjacent ones of the plurality of locomotives.

11. An apparatus as recited in claim 9, wherein said slave control means includes:

means, responsive to said communicating means, for providing respective actuation signals to the throttle means of each locomotive within the train consist and with which said slave means is associated to thereby actuate each throttle means to an actual setting;

means for comparing the actual setting of each throttle means with the respective desired setting of that throttle means; and means for switching to the setting of the throttle means of the first one of the plurality of locomotives any throttle means which said comparing means determines has an actual setting different from the respective desired setting thereof.

12. An apparatus, connected to an electrical train line having a plurality of electrical conductors and extending through a train consist which includes a master locomotive, having a throttle means, and at least one slave locomotive, for controlling the setting of a throttle means in the slave locomotive, said apparatus comprising:

a master control unit, connected to at least a portion of the train line extending through the master locomotive and responsive to the respective settings of the throttle means of the master locomotive, for computing and transmitting respective desired slave locomotive throttle means settings for the respective settings of the master locomotive throttle means, each respective desired slave locomotive throttle means setting being computed for operating the slave locomotives at an optimum power output-to-fuel consumption ratio; and a slave control unit connected to at least a portion of the train line extending through the slave locomotive, said slave control unit including:

first receiver means, connected to a single one of the electrical conductors of the train line, for receiving transmissions from said master control unit;

second receiver means, connected to a predetermined number of the electrical conductors of the train line, for receiving master locomotive throttle setting information signals transmitted on the predetermined number of electrical conductors;

electrical processor means, responsive to the transmissions received by said first and second receiver means, for controlling the operation of said slave control unit; and output means, associated with said processor means, for providing actuation signals to the throttle means of the slave locomotive so that the throttle means is placed in an actual setting.

13. An apparatus as recited in claim 12, wherein said output means includes:

first input means for receiving the master locomotive throttle setting information signals from the train line;

second input means for receiving the actuation signals from said processor means; and switch means, responsive to said processor means, for selectably connecting said first input means or said second input means to the throttle means of the slave locomotive.

14. An apparatus as recited in claim 13, wherein said processor means includes means for monitoring the signals connected through said switch means to the throttle means of the slave locomotive.

15. A system for efficiently powering a train along a track, comprising:

a first locomotive, including:
first power generating means;
first track engaging means;
first power transferring means for transferring power from said first power generating means to said first track engaging means; and
power level controlling means having a plurality of discrete settings for defining a quantity of power normally to be transferred by said first power transferring means when said first locomotive is operated in a multiple unit mode;

a second locomotive, including:
second power generating means;
second track engaging means; and
second power transferring means for transferring power in discrete quantities from said second power generating means to said second track engaging means;

a train line having a plurality of electrical conductors, said train line including:
a first segment associated with said first locomotive;
a second segment associated with said second locomotive; and
coupling means for coupling said first segment to said second segment;

a slave control unit, connected to a predetermined number of the electrical conductors in said second segment of said train line, for controlling said second power transferring means; and a master control unit connected to a predetermined number of the electrical conductors in said first segment of said train line, said master control unit including:

means for determining the desired discrete quantities of power to be transferred from said first power generating means to said first track engaging means by said first power transferring means and from said second power generating means to said second track engaging means by said second power transferring means for each discrete setting of said power level controlling means when said first and second locomotives are operated in a fuel conservation mode, said desired discrete quantities of power being those quantities of power which when summed yield a power sum being within a predetermined range of power levels for the respective discrete setting of said power level controlling means and providing a ratio with the amount of fuel consumed by said first and second power generating means for that sum of power quantities, which ratio is not less than any of the other power output-to-fuel consumption ratios which exist for different ones of the discrete quantities of power which could be supplied from said first power generating means to said first track engaging means and from said second power generating means to said second track engaging means for the respective discrete setting of said power level controlling means; and means for communicating to said slave control unit what discrete quantity of power is desired to be transferred by said second power transferring means for each discrete setting of said power level controlling means.

16. A system as recited in claim 15, wherein said slave control unit includes:

first receiver means, connected to a single one of the electrical conductors of the train line, for receiving transmissions from said master control unit;

second receiver means, connected to a second predetermined number of the electrical conductors of the train line, for receiving master locomotive throttle setting information signals transmitted on the second predetermined number of electrical conductors;

electronic processor means, responsive to the transmissions received by said first and second receiver means, for controlling the operation of said slave control unit; and output means, associated with said processor means, for providing actuation signals to the throttle means of the slave locomotive so that the throttle means is placed in an actual setting.

17. An apparatus as recited in claim 16, wherein said output means includes:

first input means for receiving the master locomotive throttle setting information signals from the train line;

second input means for receiving the actuation signals from said processor means; and switch means, responsive to said processor means, for selectably connecting said first input means or said second input means to the throttle means of the slave locomotive.

18. An apparatus as recited in claim 17, wherein said processor means includes means for monitoring the signals connected through said switch means to the throttle means of the slave locomotive.

19. An apparatus, responsive to a selected one of a plurality of selectable settings of a throttle means in a master locomotive, for controlling the power output by a train consist including the master locomotive and at least one slave locomotive having a slave locomotive throttle means, said apparatus comprising:

means for determining the total power output which would normally be provided by the train consist when the throttle means of the locomotives of the train consist are at the selected setting of the throttle means of the master locomotive;

means for defining a respective range of total power outputs for each selectable setting of the throttle means of the master locomotive, each respective range including the value of the total power output which would normally be provided by the train consist for the respective selectable setting of the throttle means of the master locomotive;

means for determining combinations of possible settings of the throttle means of the locomotives of the train consist which yield total power outputs having values within each of the respective ranges;

means for selecting an optimum one of said combinations of possible settings for each respective selectable setting of the throttle means of the master locomotive, each optimum combination yielding the highest ratio of the power output to be provided by the train consist when the throttle means of the locomotives are set at the desired settings of said optimum combination to the fuel consumed for that power output; and means for placing the throttle means of the locomotives of the train consist in the respective desired settings of the respective optimum combination in response to the respective selected setting of the throttle means of the master locomotive.

20. An apparatus as recited in claim 19, further comprising means for determining the specific number and types of locomotives in the train consist.

21. An apparatus as recited in claim 19, further comprising fail safe means for switching the throttle means of the slave locomotive to the same setting as the selected setting of the throttle means of the master locomotive when the actual setting of the throttle means of the slave locomotive is not the same as the desired setting for the throttle means of the slave locomotive for the selected optimum combination for the respective selected setting of the throttle means of the master locomotive.

22. A system for powering a train along a track, said train including a first locomotive having first power generating means, first track engaging means, first power transferring means for transferring power from the first power generating means to the first track engaging means, and power level controlling means having a plurality of discrete settings for providing first electrical signals for controlling the quantity of power transferred by the train, and said train also including a second locomotive having second power generating means, second track engaging means, and second power transferring means for transferring power from the second power generating means to the second track engaging means, said system comprising:

master control means, including:
first controller means, comprising:
power output determining means for determining the desired quantities of power to be transferred from the first power generating means and the second power generating means to the first track engaging means and the second track engaging means, respectively, for each discrete setting of the power level controlling means, said desired quantities of power being those quantities of power within a predetermined range of power levels for the respective discrete setting of the power level controlling means and said desired quantities of power providing a ratio with the amount of fuel consumed by the first and second power generating means for the sum of said desired quantities of power, which ratio is not less than any other power output-to-fuel consumption ratio which exists for different ones of the discrete quantities of power which could be supplied from the first power generating means and the second power generating means to the first track engaging means and the second track engaging means, respectively, for the respective discrete setting of the power level controlling means;

means for communicating to the second locomotive that portion of said discrete quantities of power to be transferred by said the second transferring means for a respective discrete setting of the power level controlling means; and means, responsive to the respective setting of the power level controlling means, for providing second electrical signals for controlling the first power transferring means to transfer that portion of power from the first power generating means to the first track engaging means as determined by said power output determining means; and first switch means, responsive to said first controller means, for switchably connecting either the first electrical signals from the power level controlling means or the second electrical signals from said first controller means to the first power transferring means; and slave control means including:
second controller means for providing third electrical signals for controlling the second power transferring means to transfer that portion of the discrete quantity of power determined by said power output determining means to be transferred by the second power transferring means for the respective setting of the power level controlling means; and second switch means, responsive to said second controller means, for switchably connecting either the first electrical signals from the power level controlling means or the third electrical signals from said second controller means to the second power transferring means.

23. A method of controlling a throttle means of a slave locomotive in a train consist including both a master locomotive having a throttle means and the slave locomotive, said method comprising the steps of:

(a) detecting the setting of the throttle means of the master locomotive; and (b) operating the throttle means of the slave locomotive at an optimum power output-to-fuel consumption ratio within a predetermined range of power levels in response to the setting of the throttle means of the master locomotive.

24. A method as recited in claim 23, wherein said step (b) includes the step of computing a desired setting of the throttle means of the slave locomotive yielding the optimum power output-to-fuel consumption ratio within a predetermined range of power levels for each respective setting of the throttle means of the master locomotive.

25. A method as recited in claim 24, wherein the step of computing the desired setting includes the steps of:
   storing a collection of locomotive performance data; and
   utilizing at least a portion of the collection of data to compute the desired setting of the throttle means of the slave locomotive for each respective setting of the throttle means of the master locomotive.

26. A method as recited in claim 24, wherein said step (b) further includes the step of providing actuation signals to the throttle means of the slave locomotive to thereby actuate the throttle means to an actual setting.

27. A method as recited in claim 26, wherein said step (b) further includes the step of comparing the actual setting of the throttle means of the slave locomotive with the desired setting thereof for each respective setting of the throttle means of the master locomotive.

28. A method as recited in claim 27, wherein said step (b) further includes the step of switching the throttle means of the slave locomotive to the same setting as the setting of the throttle means of the master locomotive when the actual setting of the throttle means of the slave locomotive is determined not to be the same as the desired setting thereof for the respective setting of the throttle means of the master locomotive.

29. A method as recited in claim 28, wherein the step of computing the desired setting includes the steps of:
   storing a collection of locomotive performance data; and
   utilizing at least a portion of the collection of data to compute the desired setting of the throttle means of the slave locomotive for each respective setting of the throttle means of the master locomotive.

30. A method of controlling the settings of a throttle means of a slave locomotive in response to any selectable one of a plurality of settings of a throttle means of a master locomotive, said method comprising the steps of:
   computing an optimum setting of the throttle means of the slave locomotive for each selectable setting of the throttle means of the master locomotive;
   presetting a control means in the slave locomotive for setting the throttle means of the slave locomotive to the respective computed setting when the throttle means of the master locomotive is set at one of the selectable settings;
   switching the setting of the throttle means of the slave locomotive to the same setting as the throttle means of the master locomotive if the actual setting of the throttle means of the slave locomotive is not the same as the respective computed setting.

* * * * *